(12) United States Patent
Maienschein et al.

(10) Patent No.: US 10,648,531 B2
(45) Date of Patent: May 12, 2020

(54) HYBRID MODULE FOR A MOTOR VEHICLE

(71) Applicant: Schaeffler Technologies AG & Co. KG, Herzogenaurach (DE)

(72) Inventors: Stephan Maienschein, Baden-Baden (DE); Mario Degler, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 83 days.

(21) Appl. No.: 15/524,560

(22) PCT Filed: Oct. 16, 2015

(86) PCT No.: PCT/DE2015/200478
§ 371 (c)(1),
(2) Date: May 4, 2017

(87) PCT Pub. No.: WO2016/070878
PCT Pub. Date: May 12, 2016

(65) Prior Publication Data
US 2017/0314639 A1    Nov. 2, 2017

(30) Foreign Application Priority Data
Nov. 6, 2014 (DE) .......................... 10 2014 222 644

(51) Int. Cl.
| F16F 15/123 | (2006.01) |
| B60K 6/40 | (2007.10) |
| F16D 13/52 | (2006.01) |
| F16F 15/134 | (2006.01) |
| F16F 15/14 | (2006.01) |

(Continued)

(52) U.S. Cl.
CPC ......... *F16F 15/12353* (2013.01); *B60K 6/30* (2013.01); *B60K 6/40* (2013.01); *B60K 6/48* (2013.01); *F16D 13/52* (2013.01); *F16F 15/13476* (2013.01); *F16F 15/145* (2013.01); *F16F 15/1457* (2013.01); *B60K 2006/4825* (2013.01); *B60Y 2200/92* (2013.01); *B60Y 2400/48* (2013.01); *F16D 3/12* (2013.01); *Y10S 903/902* (2013.01)

(58) Field of Classification Search
CPC ............ F16F 15/12353; F16F 15/1457; B60Y 2200/92; B60Y 2400/48; B60K 6/30; B60K 6/40; B60K 6/48; Y10S 903/902
See application file for complete search history.

(56) References Cited

U.S. PATENT DOCUMENTS

| 2007/0007059 A1 | 1/2007 | Shinichi et al. | |
| 2013/0116079 A1* | 5/2013 | Wahl .................. | F16H 1/36 475/5 |
| 2017/0210375 A1* | 7/2017 | Orlamunder ............ | B60K 6/48 |

FOREIGN PATENT DOCUMENTS

| CN | 103380312 A | 10/2013 |
| CN | 103917802 A | 7/2014 |

(Continued)

*Primary Examiner* — Mark J Beauchaine (57) ABSTRACT

A hybrid module for a motor vehicle power train, including an input side for connecting to an internal combustion engine, an output side for connecting to a drive wheel, an electric drive motor comprising a stator and a rotor and a torque transfer device arranged between the roto and the output side. The transfer device is designed to reduce rotational irregularity.

12 Claims, 6 Drawing Sheets

(51) Int. Cl.
*B60K 6/30* (2007.10)
*B60K 6/48* (2007.10)
F16D 3/12 (2006.01)

(56) References Cited

FOREIGN PATENT DOCUMENTS

| | | |
|---|---|---|
| DE | 102010030690 A1 | 1/2012 |
| DE | 102011078110 A1 | 12/2012 |
| DE | 102013213422 A1 | 2/2014 |
| DE | 102013201667 A1 | 8/2014 |

* cited by examiner

HYBRID MODULE FOR A MOTOR VEHICLE

CROSS-REFERENCE TO RELATED APPLICATION

The present application is the U.S. national stage application pursuant to 35 U.S.C. § 371 of International Application No. PCT/DE2015/200478, filed Oct. 16, 2015, which application claims priority from German Patent Application No. DE 10 2014 222 644.9, filed Nov. 6, 2014, which applications are incorporated herein by reference in their entireties.

TECHNICAL FIELD

The present disclosure relates to a hybrid module for a power train in a motor vehicle. In particular, the present disclosure relates to the reduction of a torque irregularity in the hybrid module.

In a power train, for example of a motor vehicle, two different drive motors are provided. A first drive motor customarily includes an internal combustion engine, while a second motor is constructed as an electromotor. In one embodiment, a rotor of the electromotor is permanently connected to an input shaft of a transmission which acts on a drive wheel of the motor vehicle. Customary techniques which are used to reduce a rotational irregularity of a rotary movement made available by the internal combustion engine usually do not take into account the electromotor. An inherent oscillation form of the power train can be significantly altered by the electromotor. As a consequence, unfavorable oscillation amplitudes can result, especially at the transmission input. This can result in undesired vibrations or noises which can adversely affect the comfort.

SUMMARY

The present disclosure describes a hybrid module which makes available an improved reduction of a rotational irregularity or of rotational oscillation. The present disclosure solves this problem with a hybrid module.

The present disclosure discloses a hybrid module for a power train of a motor vehicle including an input side for connection to an internal combustion engine, an output side for connection to a drive wheel, an electrical drive motor with a stator and a rotor and a torque transfer device between the rotor and the output side. The torque transfer device is constructed for reducing a rotational irregularity.

The hybrid module is also known by the designation of hybrid head. The rotational movement, which is coupled to the drive wheel, is better controlled by placing the torque transfer device constructed for fixing a rotational irregularity on the side remote from the coupling of the internal combustion engine. In particular, the rotary movement is smoothed independently of whether the coupling is open or closed. The coupling is designed for the complete or only a partial separation of the power train. To this end, a dry coupling is provided in an example embodiment; however, in one example embodiment, the coupling also includes a wet coupling, in particular a multi-disk wet coupling.

The torque transfer device, in one example, includes an absorber, in particular a centrifugal pendulum, which is constructed in particular as a speed-adaptive absorber or as a fixed frequency absorber. The speed-adaptive absorber effectively reduces rotational oscillations of different frequencies in an effective manner, whereas the fixed-frequency absorber reduces rotational oscillations of a certain frequency.

The centrifugal pendulum includes at least one pendulum mass, which is located axially inward, which means arranged between two axially separated pendulum mass carriers (pendulum flanges), and which is received in a pivotable manner opposite the two axially separated pendulum mass carriers. Also or alternatively, a pendulum mass pair is provided including at least two axially spaced pendulum masses which receive a pendulum mass carrier (pendulum flange) axially between the at least two axially spaced pendulum masses on which the at least two axially spaced pendulum masses are received in a pivotable manner.

In an example embodiment, the centrifugal pendulum is constructed as a trapezoidal pendulum, characterized by an intrinsic rotation of the pendulum mass, which occurs during the movement of the pendulum mass along the pendulum path.

The rotor is active as an adaptive absorber to reduce rotational oscillations. In an example embodiment, the rotor counteracts the rotational oscillations in antiphase by a purposeful electrical control.

Alternatively or additionally, in an example embodiment, the torque transfer device includes a torsion damper with an elastic element. The elastic element allows a predetermined rotation of the power train, as a result of which the rotary movement is smoothed.

In another embodiment, the torque transfer device includes a centrifugal pendulum and a torsion damper with an elastic element. The centrifugal pendulum is arranged parallel to the torsion damper. A pendulum flange of the centrifugal pendulum, to which a pendulum mass movable in the plane of rotation is attached, is therefore located outside of the torque flow between the internal combustion engine and the electromotor and the drive wheel. The centrifugal pendulum is accordingly dimensioned smaller. The hybrid module is made more compact as a result.

In an example embodiment, the torsion damper is arranged between the coupling and the output side and in front of or after the centrifugal pendulum. The pendulum flange of the centrifugal pendulum is located here in the torque flow between the internal combustion engine and the electromotor and the drive wheel. The torsion damper and the pendulum flange of the centrifugal pendulum are advantageously mechanically integrated with one another, which yields an improved utilization of space.

In an example embodiment, the torsion damper includes one or more damper stages. For example, each torsion damper includes a respective elastic element in the form of a bent spring. The bent spring enables an increased angle of rotation in the power train and as a result makes available an improved smoothing, in particular of low-frequency rotational irregularities. In another embodiment, the elastic element also includes a straight cylindrical spring. Even other embodiments are possible in which torsion dampers with elastic elements of the same or of different types are arranged in the hybrid module.

In an example embodiment, a second torque transfer device is inserted between the input side and the coupling. The second torque transfer device is constructed to reduce a rotational irregularity.

For example, the second torque transfer device is constructed in different forms, which are described above with reference made to the first torque transfer device. In the case of a closed coupling, the two torque transfer devices can act practically on the same rotating mass, which includes the coupling and the rotor of the electromotor. For example, for the preceding configuration, it is preferred that the rigidity of this transfer stretch is sufficiently high. If the coupling is open, the part of the power train running to the drive wheel is handled only by the first torque transfer device as regards a rotational irregularity.

In another example embodiment, the second transfer device includes an absorber, which for example is constructed as a centrifugal pendulum. The centrifugal pendulum is readily and economically integrated with the other elements of the hybrid module. Moreover, the centrifugal pendulum acts effectively to reduce rotational irregularities.

In an example embodiment, the rotor is constructed as an active absorber in order to reduce rotational irregularities, in particular rotational oscillations.

In yet another example embodiment, the hybrid module includes a hydraulic activation device for the coupling. The hybrid module is, as a consequence, constructed in an improved manner as a functional block which is integrated more easily in a system for driving the motor vehicle. In another example embodiment, the activation device for the coupling also is electrically built up. For example, the activation device is arranged at a position in the hybrid module, which is poorly accessible so that the connection of the activation device to the coupling and the control can be easily maintained.

In an example embodiment, the coupling is radially arranged inside the rotor. The rotor is constructed, for example, as a hollow shaft on whose radially inner side the coupling lies. The hybrid module therefore has reduced outside dimensions in the axial or the radial direction.

Furthermore, in an example embodiment, the transfer device is arranged inside the rotor. The preceding arrangement applies, for example, to the first-cited transfer device. Alternatively or additionally, the other transfer device are arranged radially inside the rotor. This results in more space saved.

BRIEF DESCRIPTION OF THE DRAWINGS

The invention will now be described in detail with reference made to the attached figures, in which.

DETAILED DESCRIPTION

Figure 1:
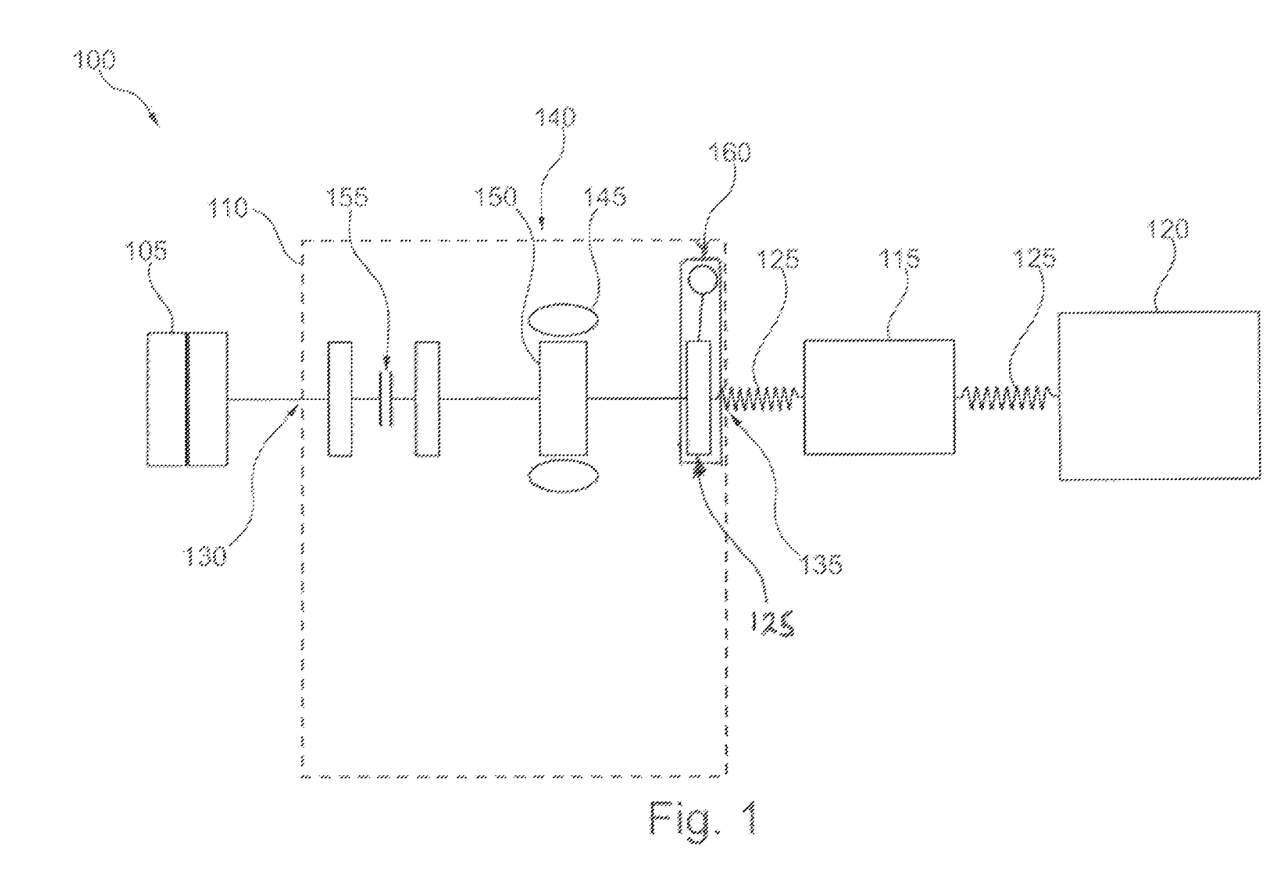
FIG. 1 shows a power train with a hybrid module for being inserted into a motor vehicle.

FIG. 1 shows power train 100, for example in a motor vehicle. Power train 100 includes internal combustion engine 105, hybrid module 110, optional transmission 115 and drive wheel 120. Transmission 115 is, for example, a partially or completely automatic transmission, for example, a double coupling transmission, a stepped automatic transmission or a Continuously Variable Transmission, (CVT). Torsion dampers or rotary oscillation dampers 125 are provided at different locations on the power train 100, for example, between hybrid module 110 and transmission 115, or between transmission 115 and drive wheel 120.

Hybrid module 110 includes input side 130 for the connection to internal combustion engine 105, and output side 135 for the connection to the part of power train 100 running to drive wheel 120. Electromotor 140 with stator 145 and rotor 150 is provided as an electrical drive motor for the motor vehicle. Separable coupling 155 and transfer device 160 for torque are provided. Coupling 155 is arranged between input side 130 and rotor 150 of electromotor 140, and is arranged to to interrupt a torque flow in power train 100 as a function of an activation. Transfer device 160 is arranged between rotor 150 of electromotor 140 and output side 135.

In the example embodiment of FIG. 1, electromotor 140 includes stator 145 lies radially outside and rotor 150 lies radially inside. In an example embodiment (not shown) the inverse arrangement is selected. Transfer device 160 is designed to reduce a rotational irregularity, which can be superposed on the rotary movement of output side 135. As further described below, transfer device 160 can be a centrifugal pendulum or a torsion damper.

Figure 2:
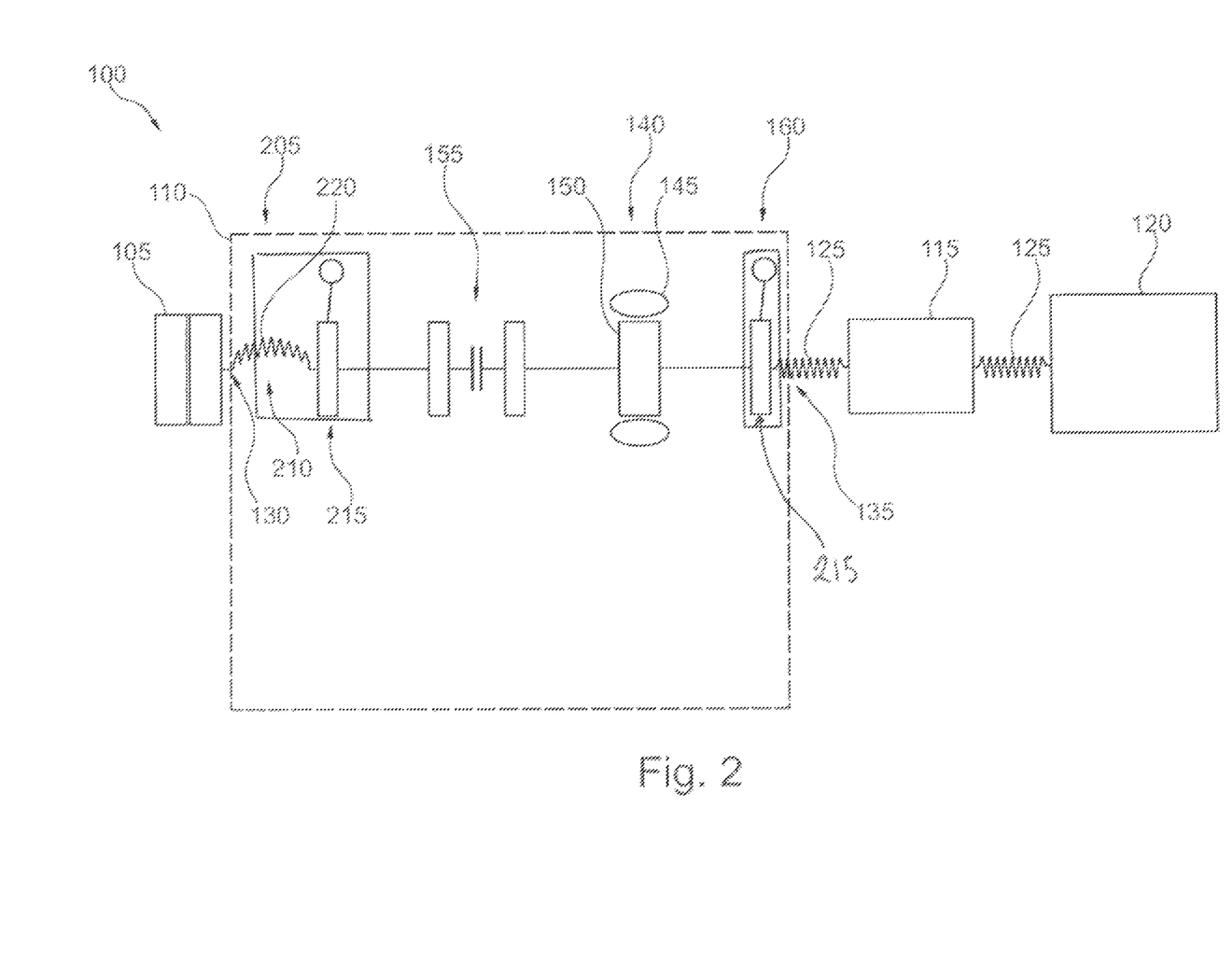
FIG. 2 shows the power train in FIG. 1 with an alternative embodiment of the hybrid module.

FIG. 2 shows power train 100 of FIG. 1 with an alternative embodiment of hybrid module 110. In distinction to the embodiment shown in FIG. 1, transfer device 205 is present here, between the input side 130 and coupling 155, in addition to transfer device 160. In an example embodiment, transfer device 205 includes rotary oscillation damper 210, centrifugal pendulum 215 or, as shown, a combination of damper 210 and pendulum 215. Rotary oscillation damper 210 shown includes elastic element 220, which is designed to allow a predetermined rotation, between input side 130 and a slide connected to coupling 155.

In an example embodiment, elastic element 220 is, as indicated, designed as a bent spring or as a cylindrical spring lying radially inward or radially outward. Other embodiments are described in more detail below with reference made to FIG. 3. Otherwise, the same possibilities for variation as for the other transfer device 205 apply to transmission device 160 and inversely.

Figure 3:
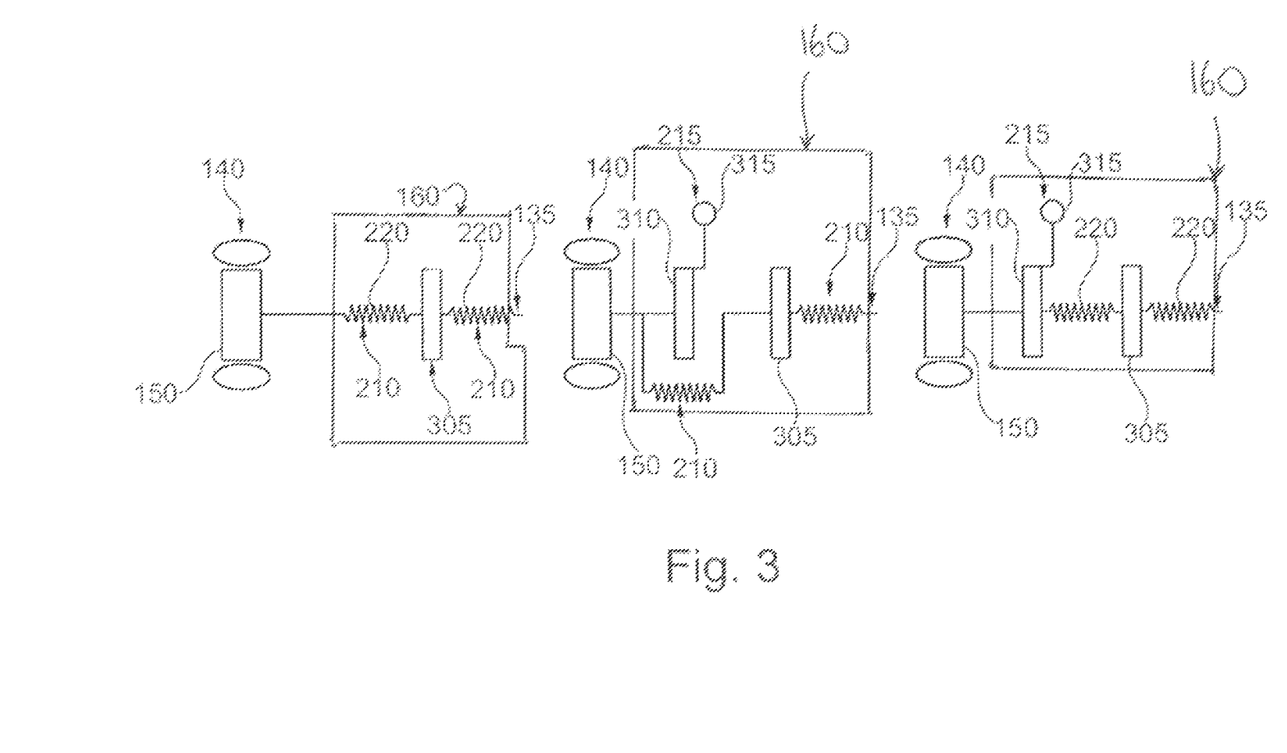
FIG. 3 shows variants of a transmission device for torques for the hybrid module of FIGS. 1 and 2.

FIG. 3 shows variants of transfer device 160 for hybrid module 110 of FIGS. 1 and 2.

In the embodiment shown on the left in FIG. 3, two rotary oscillation dampers 210 are arranged in series between rotor 150 of electromotor 140 and output side 135. In an example embodiment, flange 305 is provided between rotary oscillation dampers 210. Rotary oscillation dampers 210 each comprise elastic element 220 of which each one is constructed alternatively as a bent spring or as a cylindrical spring. In one embodiment, both elastic elements 220 are constructed as cylindrical springs. One elastic element 220 is attached radially inward and one element 220 is attached radially outward to the flange part 105.

In the central embodiment of FIG. 3, centrifugal pendulum 215 is connected to rotor 150 of electromotor 140. Centrifugal pendulum 215 includes pendulum flange 310 connected to rotor 150, and includes pendulum mass 315, which is shiftably fastened in the plane of rotation of pendulum flange 310 to mass 315. In the embodiment of FIG. 3B, pendulum flange 310 lies outside of the torque flow between rotor 150 and output side 135 and, expressed more generally, outside of the torque flow between internal combustion engine 105 and drive wheel 120.

The embodiment shown on the right in FIG. 3, centrifugal pendulum 215 is not parallel to rotary oscillation damper 210, but is connected in series so that pendulum flange 310 lies in the transferred torque flow.

Figure 4:
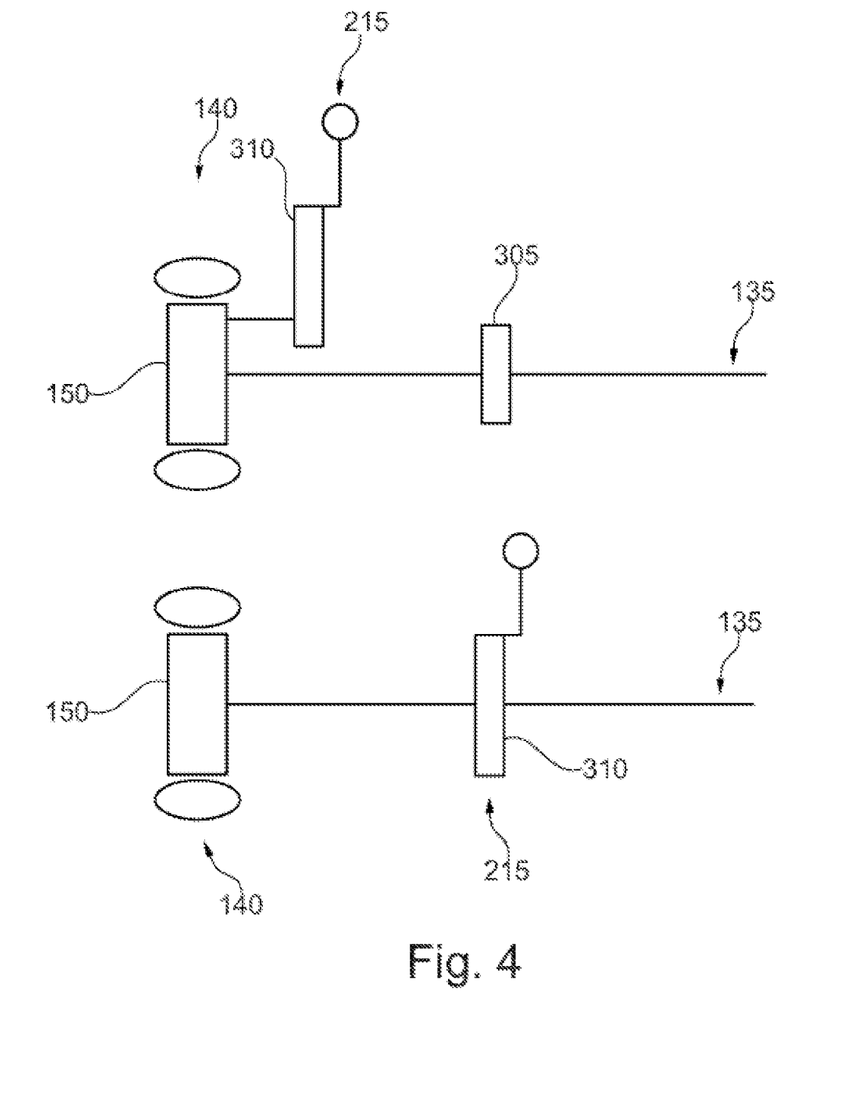
FIG. 4 shows variants of a centrifugal pendulum as a transmission device for torques for the hybrid module of FIG. 1 or 2.

FIG. 4 shows variants of centrifugal pendulum 215 as transfer device 160 for torques for hybrid module 110 of FIG. 1 or 2. In the embodiment shown in the upper area of FIG. 4, pendulum flange 310 is parallel to flange 305, which leads output side 135, and is connected to rotor 150 of electromotor 140. The torque flowing between input side 130 and output side 135 does not flow through pendulum flange 310.

In the embodiment shown in the lower area of FIG. 4, flange 305 and pendulum flange 310 coincide so that pendulum flange 310 of centrifugal pendulum 215 lies in the torque flow between input side 130 and output side 135 of hybrid module 110.

Figure 5:
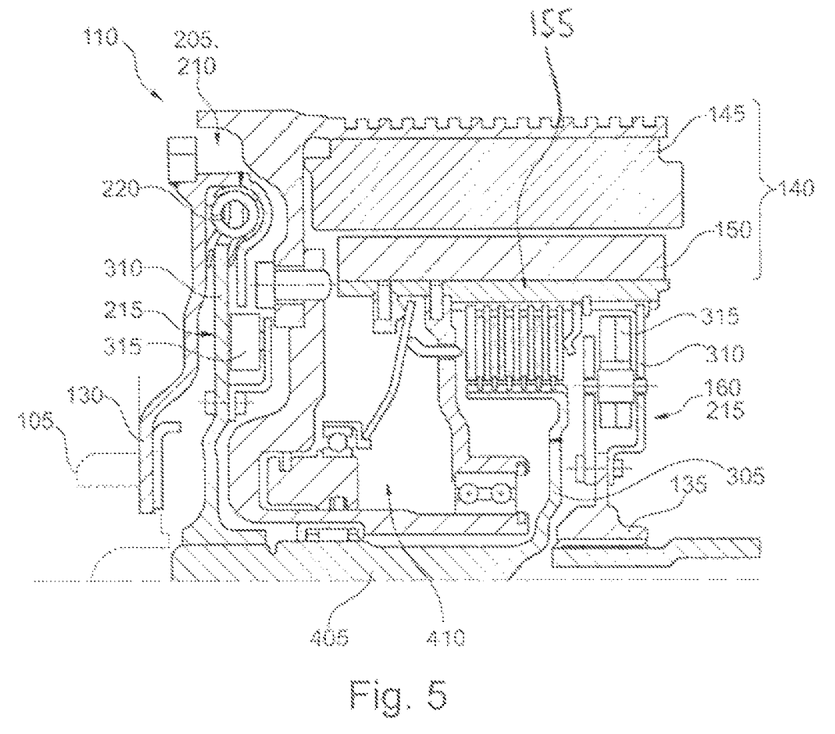
FIG. 5 shows an exemplary embodiment for a hybrid module.

FIG. 5 shows an exemplary embodiment for hybrid module 110. The embodiment shown substantially corresponds to the one in FIG. 2. Input side 130 for the connection to internal combustion engine 105 is shown on the left. From input side 130, the torque flow goes radially outward and via elastic element 220, designed by way of example as a bent spring of rotary oscillation damper 210, to pendulum flange 310 of centrifugal pendulum 215. Pendulum mass 315 of centrifugal pendulum 215 is constructed purely by way of example lying axially on the inside, as will be explained in more detail below with reference made to FIG. 6.

On the radial inside of pendulum flange 310 the torque flow runs via shaft 405 axially to the right in the representation and then via flange 305 radially outward to coupling 155. Coupling 155 is constructed by way of example as a wet-running multi-disk laminar coupling. Coupling 155 is. in a example embodiment, located radially inside rotor 150 of electromotor 140. Lamellae and frictional elements of coupling 155 are axially pressed against each other by activation device 410 constructed by way of example as a hydraulic activation device in order to forward the torque flow to rotor 150 of electromotor 140.

Transfer device 160, which is constructed as centrifugal pendulum 215, is also connected to rotor 150. Pendulum flange 310 of centrifugal pendulum 215 runs radially inward to output side 135 of hybrid module 110. Centrifugal pendulum 215 also includes, by way of example, axially inwardly located pendulum mass 315.

Figure 6:
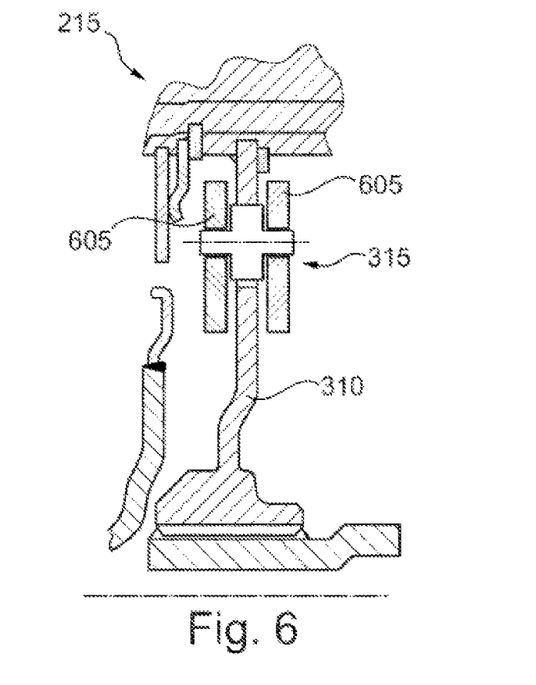
FIG. 6 shows an exemplary embodiment for a centrifugal pendulum as transfer device for torques in a hybrid module.

FIG. 6 shows an exemplary embodiment for centrifugal pendulum 215 as transfer device 205 or 160 in hybrid module 110 of FIG. 1 or 2. In FIG. 6, pendulum mass 315 lying axially outside is used, which comprises two pendulum elements 605, which lie on different axial sides of pendulum flange 310 and are connected to one another.

Figure 7:
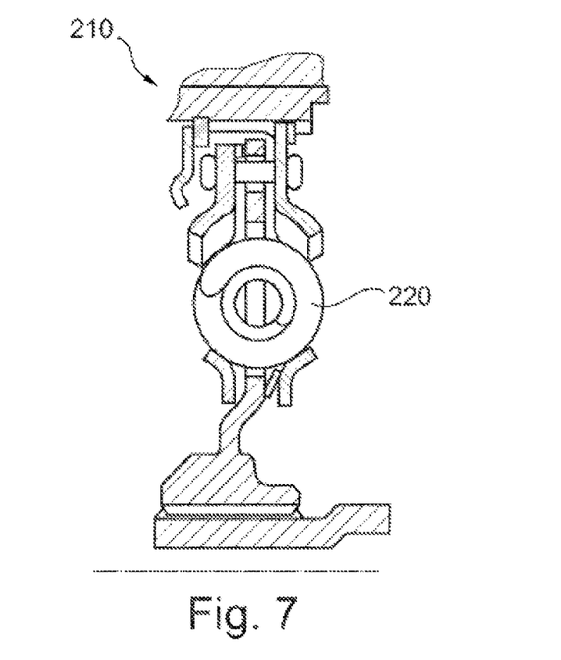
FIG. 7 shows an exemplary embodiment for a rotating oscillation damper as transfer device for torques in a hybrid module.

FIG. 7 shows an exemplary embodiment for rotary oscillation damper 210 as transfer device 205 or 160 in hybrid module 110 of FIG. 1 or 2. Elastic element 220 is constructed in FIG. 7 as a cylindrical spring. An arrangement of several cylindrical springs can also be used, for example, two coaxial cylindrical springs connected in parallel, as shown.

LIST OF REFERENCE NUMERALS 100 power train
105 internal combustion engine
110 hybrid module
115 transmission
120 drive wheel
125 rotary oscillation damper
130 input side
135 output side
140 electromotor
145 stator
150 rotor
155 coupling
160 torque transfer device
205 torque transfer device
210 rotary oscillation damper
215 centrifugal pendulum
220 elastic element
305 flange
310 pendulum flange
315 pendulum mass
405 shaft
410 activation device

The invention claimed is:

1. A hybrid module for a power train of a motor vehicle, comprising:
    an input side for connection to an internal combustion engine;
    an output side for connection to a drive wheel;
    an electrical drive motor including a stator and a rotor;
    a first torque transfer device including a first centrifugal pendulum connected to the rotor and including a first pendulum mass; and,
    a second torque transfer device, wherein the first centrifugal pendulum is between the rotor and the output side and is connected to the output side; wherein the second torque transfer device includes a torsion damper with an elastic element; and, wherein the torsion damper is located between the input side and the first torque transfer device and is connected to the input side.

2. The hybrid module of claim 1 further comprising:
    a second torque transfer device; and,
    a separable coupling, wherein the second torque transfer device includes a centrifugal pendulum located between the input side and the separable coupling and connected to the separable coupling.

3. The hybrid module of claim 1, further comprising:
    a second torque transfer device; and,
    a separable coupling, wherein:
        the second torque transfer device includes:
            a torsion damper with an elastic element; and,
            a second centrifugal pendulum;
        the torsion damper is located between the input side and the second centrifugal pendulum and connected to the input side and the second centrifugal pendulum; and,
        the second centrifugal pendulum is located between the torsion damper and the separable coupling and is connected to the torsion damper and the separable coupling.

4. A method of using the hybrid module recited in claim 1, comprising:
    connecting the input side to the internal combustion engine;
    connecting the output side to the drive wheel;
    connecting a separable coupling to the input side and the rotor;
    closing the separable coupling;
    flowing first torque from the internal combustion engine to the output side through, in sequence, the separable coupling, the rotor and the first centrifugal pendulum; and,
    reducing, with the first centrifugal pendulum, first rotational oscillations at the output side.

5. A method of using the hybrid module recited in claim 1, the method comprising:
- connecting the input side to the internal combustion engine;
- connecting the output side to the drive wheel;
- connecting a separable coupling to the second torque transfer device and the rotor;
- closing the separable coupling;
- flowing torque from the internal combustion engine to the output side through, in sequence, the torsion damper, the separable coupling, the rotor, and the first centrifugal pendulum; and,
- reducing, with the torsion damper, and the first centrifugal pendulum, rotational oscillations at the output side.

6. A hybrid module for a power train of a motor vehicle, comprising:
- an input side for connection to an internal combustion engine;
- an output side for connection to a drive wheel;
- an electrical drive motor including a stator and a rotor;
- a separable coupling located between the input side and the rotor and connected to the rotor;
- a torsion damper with an elastic element, the torsion damper located between the input side and the separable coupling and connected to the input side;
- a first centrifugal pendulum including a first pendulum mass, the first centrifugal pendulum located between the torsion damper and separable coupling and connected to the torsion damper and the separable coupling; and,
- a second centrifugal pendulum located between the rotor and the output side and connected to the rotor and the output side.

7. A hybrid module for a power train of a motor vehicle, comprising:
- an input side for connection to an internal combustion engine;
- an output side for connection to a drive wheel;
- an electrical drive motor including a stator and a rotor;
- a first torque transfer device including a first torsion damper with a first elastic element, the first torsion damper between the rotor and the output side and connected to the rotor; and,
- a centrifugal pendulum connected to the rotor and in parallel to the first torsion damper.

8. The hybrid module of claim 7, further comprising:
- a second torsion damper with a second elastic element, the second torsion damper located between the first torsion damper and the output side and connected to the output side; and,
- a flange located between the first torsion damper and the second torsion damper and connected to the first torsion damper and the second torsion damper.

9. A method of using the hybrid module recited in claim 8, comprising:
- connecting the input side to the internal combustion engine;
- connecting the output side to the drive wheel;
- connecting a separable coupling to the input side and the rotor;
- closing the separable coupling;
- flowing torque from the internal combustion engine to the output side through, in sequence, the separable coupling, the rotor, the first torsion damper, the flange, and the second torsion damper; and,
- reducing, with the first torsion damper, and the second torsion damper, rotational oscillations at the output side.

10. The hybrid module of claim 7, further comprising:
- a second torsion damper with a second elastic element; and,
- a flange, wherein:
  - the second torsion damper is located between the first torsion damper and the output side and is connected to the output side; and,
  - the flange is located between the first torsion damper and the second torsion damper and is connected to the first torsion damper and the second torsion damper.

11. A method of using the hybrid module recited in claim 10, comprising:
- connecting the input side to the internal combustion engine;
- connecting the output side to the drive wheel;
- connecting a separable coupling to the input side and the rotor;
- closing the separable coupling;
- flowing torque from the internal combustion engine to the output side through, in sequence, the separable coupling, the rotor, the first torsion damper, the flange, and the second torsion damper; and,
- reducing, with the centrifugal pendulum, the first torsion damper, and the second torsion damper, rotational oscillations at the output side.

12. A method of using the hybrid module recited in claim 7, comprising:
- connecting the input side to the internal combustion engine;
- connecting the output side to the drive wheel;
- connecting the first torsion damper to the output side;
- connecting a separable coupling to the input side and the rotor;
- closing the separable coupling;
- flowing first torque from the internal combustion engine to the output side through, in sequence, the separable coupling, the rotor and the first torsion damper; and,
- reducing, with the first torsion damper, first rotational oscillations at the output side.

* * * * *